(12) United States Patent
Gu

(10) Patent No.: US 11,580,205 B2
(45) Date of Patent: *Feb. 14, 2023

(54) WEARABLE DEVICE HAVING HIGH SECURITY AND STABLE BLOOD PRESSURE DETECTION

(71) Applicant: PixArt Imaging Inc., Hsin-Chu County (TW)

(72) Inventor: Ren-Hau Gu, Hsin-Chu County (TW)

(73) Assignee: PIXART IMAGING INC., Hsin-Chu County (TW)

(*) Notice: Subject to any disclaimer, the term of this patent is extended or adjusted under 35 U.S.C. 154(b) by 0 days.

This patent is subject to a terminal disclaimer.

(21) Appl. No.: 17/487,519

(22) Filed: Sep. 28, 2021

(65) Prior Publication Data

US 2022/0012324 A1 Jan. 13, 2022

Related U.S. Application Data

(63) Continuation of application No. 17/021,336, filed on Sep. 15, 2020, now Pat. No. 11,157,607, which is a continuation-in-part of application No. 16/850,753, filed on Apr. 16, 2020, now Pat. No. 10,891,362, which is a continuation of application No. 16/563,931, filed on Sep. 9, 2019, now Pat. No. 10,698,996, which is a continuation-in-part of application No. 16/519,197, filed on Jul. 23, 2019, now Pat. No. 10,554,660, which is a continuation-in-part of application No. 16/360,605, filed on Mar. 21, 2019, now Pat. No. 10,403,060, (Continued)

(30) Foreign Application Priority Data

Jul. 8, 2014 (TW) .................... 103123544
Jan. 12, 2016 (TW) .................... 105100804

(51) Int. Cl.
G06F 21/32 (2013.01)
G06F 1/16 (2006.01)
H04W 12/30 (2021.01)

(52) U.S. Cl.
CPC .............. G06F 21/32 (2013.01); G06F 1/163 (2013.01); H04W 12/35 (2021.01); G06F 2221/2139 (2013.01)

(58) Field of Classification Search
CPC ......... G06F 21/32; G06F 1/163; H04W 12/35
See application file for complete search history.

(56) References Cited

U.S. PATENT DOCUMENTS 11,157,607 B2 * 10/2021 Gu .......................... G06F 21/32

* cited by examiner

Primary Examiner — Curtis B Odom
(74) Attorney, Agent, or Firm — WPAT, PC

(57) ABSTRACT

A wearable device including a skin sensor and a processor is provided. The processor is configured to receive an authentication data for authenticating a user when a wearing state of the wearable device is adjacent to a skin surface of the user, execute a predetermined function in response to a request when the authentication data matches a pre-stored data and the skin sensor determines that the wearable device does not leave the skin surface after the authentication data is received, and reject or ignore the request when the skin sensor determines that the wearable device leaves the skin surface before the predetermined function is executed. The processor further calculates blood pressures according to PPG signals detected by a PPG sensor of the skin sensor.

20 Claims, 6 Drawing Sheets

Related U.S. Application Data which is a continuation-in-part of application No. 16/117,334, filed on Aug. 30, 2018, now Pat. No. 10,282,928, which is a continuation-in-part of application No. 15/964,718, filed on Apr. 27, 2018, now Pat. No. 10,089,802, which is a continuation-in-part of application No. 15/722,435, filed on Oct. 2, 2017, now Pat. No. 9,984,222, which is a continuation-in-part of application No. 15/343,509, filed on Nov. 4, 2016, now Pat. No. 9,818,245, which is a continuation-in-part of application No. 14/684,648, filed on Apr. 13, 2015, now abandoned, said application No. 17/021,336 is a continuation-in-part of application No. 15/350,619, filed on Nov. 14, 2016, now abandoned.

WEARABLE DEVICE HAVING HIGH SECURITY AND STABLE BLOOD PRESSURE DETECTION

RELATED APPLICATIONS

The present application is a continuation application of U.S. patent application Ser. No. 17/021,336 filed on, Sep. 15, 2020, which a continuation-in-part application of U.S. patent application Ser. No. 16/850,753 filed on, Apr. 16, 2020, which is a continuation application of U.S. patent application Ser. No. 16/563,931 filed on, Sep. 9, 2019, which is a continuation-in-part application of U.S. patent application Ser. No. 16/519,197 filed on, Jul. 23, 2019, which is a continuation-in-part application of U.S. patent application Ser. No. 16/360,605 filed on, Mar. 21, 2019, which is a continuation-in-part application of U.S. patent application Ser. No. 16/117,334 filed on, Aug. 30, 2018, which is a continuation-in-part application of U.S. patent application Ser. No. 15/964,718 filed on, Apr. 27, 2018, which is a continuation-in-part application of U.S. patent application Ser. No. 15/722,435 filed on, Oct. 2, 2017, which is a continuation-in-part application of U.S. patent application Ser. No. 15/343,509 filed on, Nov. 4, 2016, which is a continuation-in-part application of U.S. patent application Ser. No. 14/684,648 filed on, Apr. 13, 2015, and claims priority to Taiwanese Application Number 103123544, filed Jul. 8, 2014, the disclosures of which are hereby incorporated by reference herein in their entirety. The present application is a continuation application of U.S. patent application Ser. No. 17/021,336 filed on, Sep. 15, 2020, which is also a continuation-in-part application of U.S. patent application Ser. No. 15/350,619 filed on, Nov. 14, 2016, and claims priority to Taiwanese Application Number 105100804, filed Jan. 12, 2016, the disclosures of which are hereby incorporated by reference herein in their entirety.

BACKGROUND

1. Field of the Disclosure

This disclosure generally relates to a wearable device and, more particularly, to a wearable device and a controlling method thereof capable of detecting a contact status with a skin surface.

2. Description of the Related Art

Wearable devices, such as smart watches, are getting more and more popular. Wearable devices can provide various convenient functions, such as schedule management, emails, heartbeat measurement, and mobile payment. Some functions require authentication before execution because the wearable device must ensure the current user is the owner of the wearable device in order to protect the privacy or the interest of the owner.

However, authentication before execution is not secure enough in some scenarios. For example, an owner of a wearable device passes the authentication, and then the owner controls the wearable device to execute an important function such as schedule management, and then something unusual distracts the owner from the function, and then the owner puts down the wearable device and walks away. In this case, since the wearable device is still in the authenticated state, another user can pick up the wearable device and look at the owner's private schedule, even temper with the owner's private schedule.

SUMMARY

The present disclosure is related to a wearable device and a skin sensor that can make some important functions more secure after user authentication.

The present disclosure provides a wearable device including a PPG sensor and a processor. The PPG sensor is configured to generate a PPG signal. The processor is configured to receive an authentication data for authenticating the user when the wearable device is determined to be in contact with a skin surface of the user according to the PPG signal, execute a predetermined function for the user in response to a request when the authentication data matches a pre-stored data and the wearable device is determined to be still in contact with the skin surface according to the PPG signal, and reject or ignore the request when the wearable device is determined to be no longer in contact with the skin surface according to the PPG signal after the authentication data is received and before the predetermined function is executed. The processor is further configured to calculate at least one blood pressure corresponding to each pulse duration according to at least one blood pressure estimation model and a time difference between two feature points within one pulse duration of the PPG signal, and average calculated blood pressures within a predetermined time interval to generate an average blood pressure.

The present disclosure further provides a wearable device including a PPG sensor and a processor. The PPG sensor is configured to generate a PPG signal. The processor is configured to enter a first mode or a second mode. In the first mode, the processor is configured to receive an authentication data for authenticating the user when the wearable device is determined to be in contact with a skin surface of the user according to the PPG signal, execute a predetermined function for the user in response to a request when the authentication data matches a pre-stored data and the wearable device is determined to be still in contact with the skin surface according to the PPG signal, and reject or ignore the request when the wearable device is determined to be no longer in contact with the skin surface according to the PPG signal after the authentication data is received and before the predetermined function is executed. In the second mode, the processor is configured to calculate at least one blood pressure corresponding to each pulse duration according to at least one blood pressure estimation model and a time difference between two feature points within one pulse duration of the PPG signal, and average calculated blood pressures within a predetermined time interval to generate an average blood pressure.

The present disclosure further provides a wearable device including a PPG sensor and a processor. The PPG sensor is configured to generate a PPG signal according to samples acquired at a sampling frequency of the PPG sensor. The processor is configured to receive an authentication data for authenticating the user when the wearable device is determined to be in contact with a skin surface of the user according to an odd number of the samples of the PPG signal, execute a predetermined function for the user in response to a request when the authentication data matches a pre-stored data and the wearable device is determined to be still in contact with the skin surface according to the odd number of the samples of the PPG signal, and reject or ignore the request when the wearable device is determined to be no longer in contact with the skin surface according to the odd number of the samples of the PPG signal after the authentication data is received and before the predetermined function is executed. The processor is further configured to calculate at least one blood pressure corresponding to each pulse duration according to at least one blood pressure estimation model and a time difference between two feature points within one pulse duration of the PPG signal using an even number of the samples of the PPG signal, and average calculated blood pressures within a predetermined time interval to generate an average blood pressure.

BRIEF DESCRIPTION OF THE DRAWINGS

Other objects, advantages, and novel features of the present disclosure will become more apparent from the following detailed description when taken in conjunction with the accompanying drawings.

DETAILED DESCRIPTION OF THE EMBODIMENT

It should be noted that, wherever possible, the same reference numbers will be used throughout the drawings to refer to the same or like parts. The separate embodiments in the present disclosure below may be combined together to achieve superimposed functions.

Figure 1:
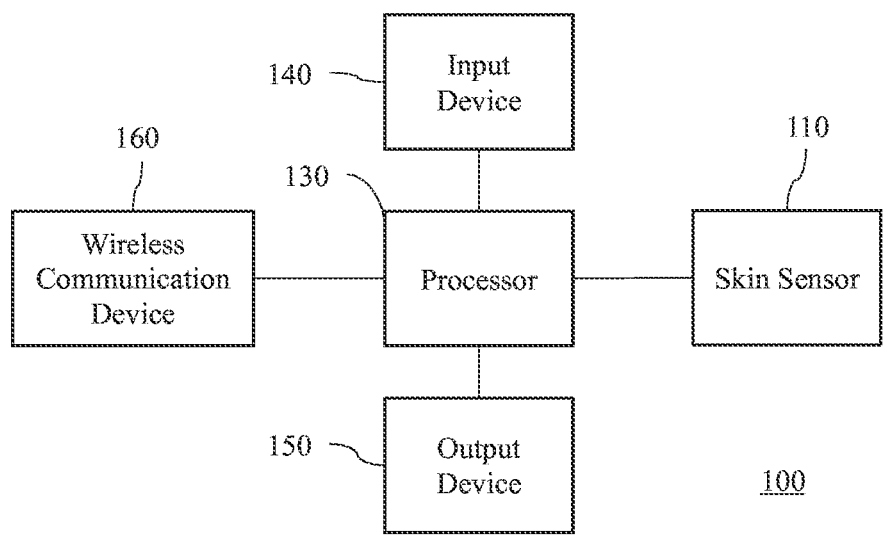
FIG. 1 is a block diagram showing a wearable device according to an embodiment of the present disclosure.

FIG. 1 is a block diagram showing a wearable device 100 according to an embodiment of the present disclosure. For example, the wearable device 100 is a smart watch, a smart wristband, a smart earphone, a smart shoe, or a pair of smart glasses. The wearable device 100 includes a skin sensor 110, a processor 130, an input device 140, an output device 150, and a wireless communication device 160. The processor 130 is electrically coupled to the skin sensor 110, the input device 140, the output device 150, and the wireless communication device 160. In one non-limiting aspect, the skin sensor 110 and the processor 130 are encapsulated in the same sensor chip.

The skin sensor 110 is equipped on a side (e.g., back side) of the wearable device 100 close to a skin surface of a user when the wearable device 100 is worn on the user. The skin sensor 110 is configured to detect the skin surface and further in some cases to detect whether the wearable device 100 leaves the skin surface of the user. The input device 140 is configured to receive user input for the wearable device 100. The output device 150 is configured to output data and/or information to the user and is also configured to display graphical user interfaces of the operating system and the applications of the wearable device 100. The wireless communication device 160 is configured to transmit and receive data and signals between the wearable device 100 and external electronic devices through wireless communication. The wireless communication device 160 uses low power wireless technology, such as Near Field Communication (NFC) technology, Bluetooth technology, Wi-Fi technology, wireless local area network (WLAN) technology, or cellular network technology for transmitting and receiving data and signals. The processor 130 is the main processor, the microcontroller unit (MCU), the central processing unit (CPU) or an application specific integrated circuit (ASIC) of the wearable device 100. The processor 130 is configured to control or cooperate with the skin sensor 110, the input device 140, the output device 150, and the wireless communication device 160 to execute various functions and applications of the wearable device 100.

Figure 2:
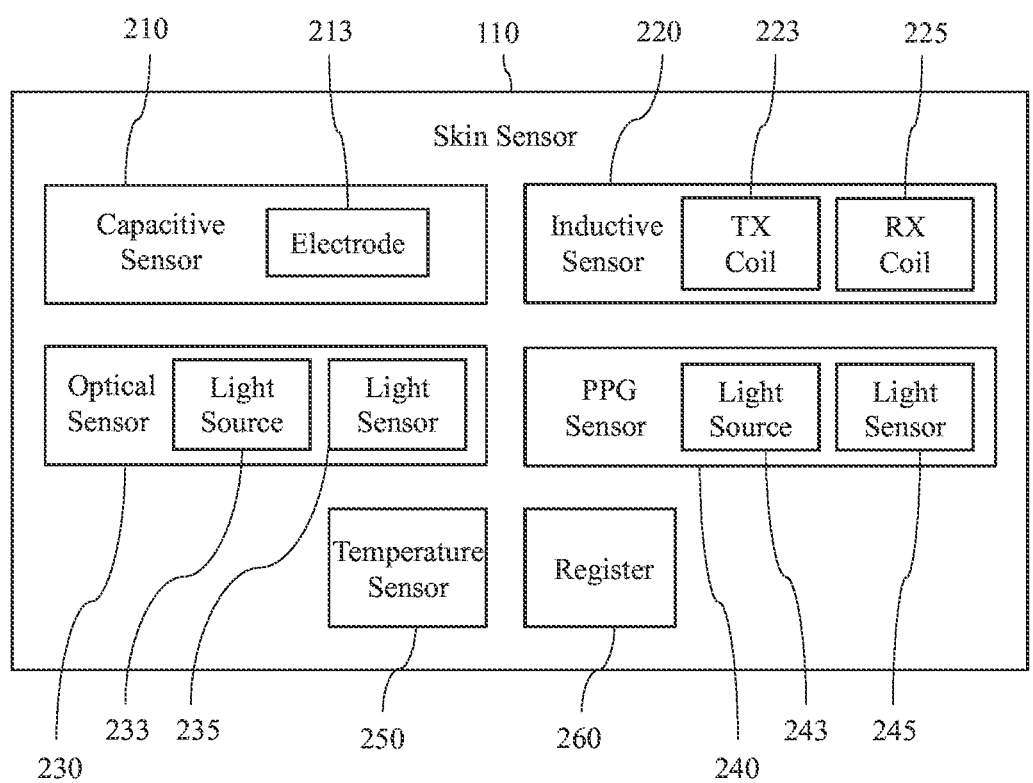
FIG. 2 is a block diagram showing a skin sensor of a wearable device according to an embodiment of the present disclosure.

FIG. 2 is a block diagram showing the skin sensor 110 of the wearable device 100 according to an embodiment of the present disclosure. The skin sensor 110 includes five sub-sensors of different types, for example, a capacitive sensor 210, an inductive sensor 220, an optical sensor 230, a photoplethysmography (PPG) sensor 240, and a temperature sensor 250. The present disclosure is not confined to exactly five sub-sensors. The number and types of sub-sensors used in the skin sensor 110 may be adjusted in another embodiment. Each sub-sensor of the skin sensor 110 is configured to use a different sensing method to detect the skin surface of a user and provide a detecting result indicating the result of detecting the skin surface. The skin sensor 110 further includes a register 260. More details of the skin sensor 110 are discussed below with reference to FIG. 3.

Figure 3:
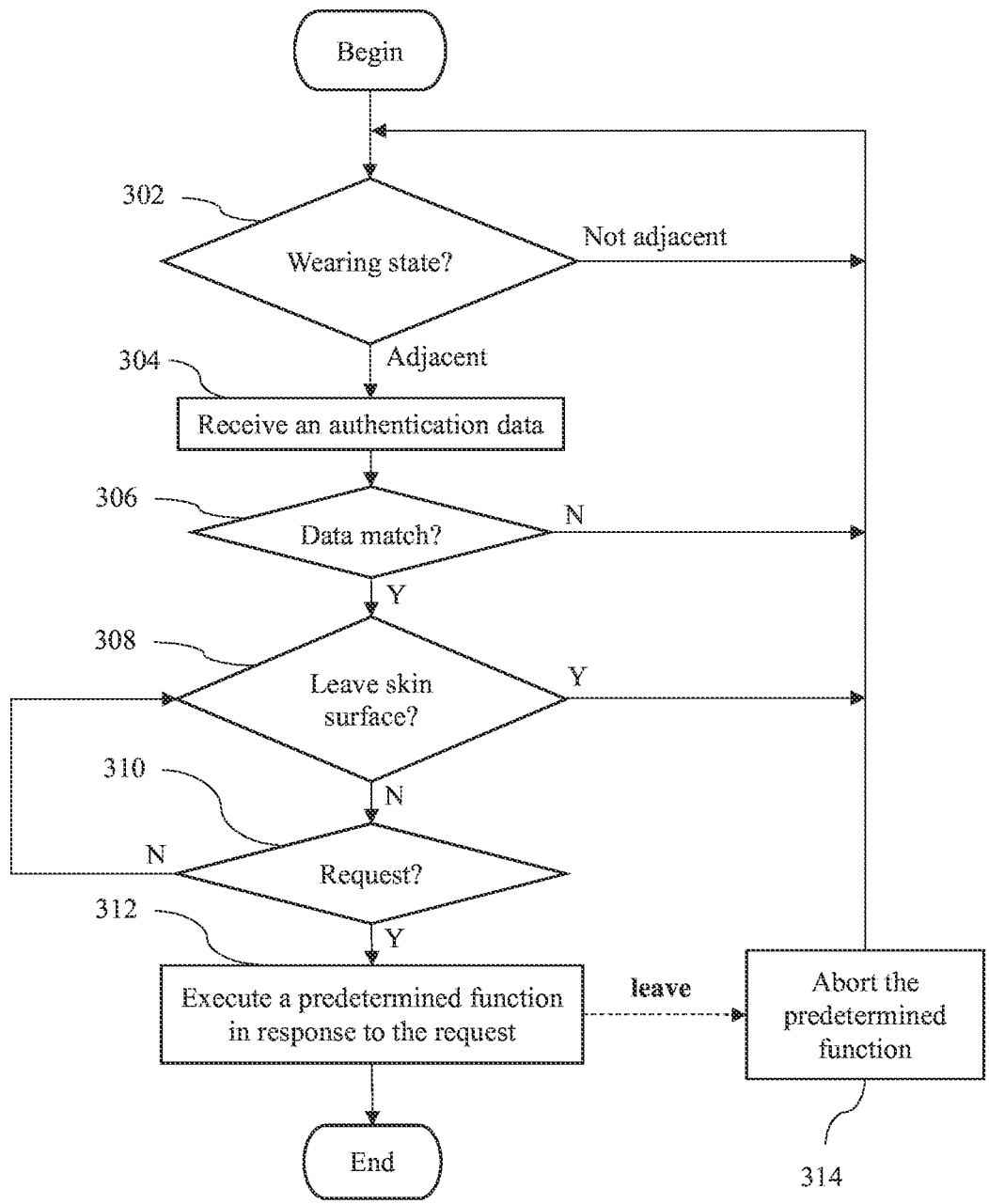
FIG. 3 is a flow chart showing a method for controlling a wearable device according to an embodiment of the present disclosure.

FIG. 3 is a flow chart showing a method for controlling a wearable device according to an embodiment of the present disclosure. The wearable device 100 executes the method in FIG. 3 starting from step 302.

At step 302, the skin sensor 110 determines a wearing state of the wearable device 100 according to (e.g., collecting and comparing) at least one of the detecting results of the sub-sensors of the skin sensor 110. The wearing state of the wearable device 100 is either "adjacent or attached to the skin surface of the user" or "not adjacent or attached to the skin surface of the user". The correspondence between the wearing state and the detecting result of each sub-sensor is described below.

The capacitive sensor 210 includes at least one electrode 213. The at least one electrode 213 is selected to be positioned on an external surface of the housing of the wearable device 100. Alternatively, the at least one electrode 213 is selected to be exposed outside the external surface of the housing of the wearable device 100. Alternatively, the at least one electrode 213 is selected to be embedded in the housing of the wearable device 100 or positioned in an internal space enclosed by the housing of the wearable device 100. The capacitive sensor 210 measures the capacitance value of the at least one electrode 213 and outputs a corresponding capacitance value as the detecting result of the capacitive sensor 210. The capacitance value output by the capacitive sensor 210 is the capacitance value of the at least one electrode 213, or a voltage value or a length of charging/discharging time indicating the capacitance value of the at least one electrode 213. Since the skin of the user is an electrical conductor, approaching or leaving the skin surface of the user results in a distortion of the electrostatic field generated by the at least one electrode 213, and the capacitance value of the at least one electrode 213 changes according to the distortion of the electrostatic field. Therefore, the skin sensor 110 can determine the wearing state of the wearable device 100 according to the capacitance value output by the capacitive sensor 210.

In an embodiment, the capacitance value output by the capacitive sensor 210 increases when the wearable device 100 approaches the skin surface of the user and the capacitance value output by the capacitive sensor 210 decreases when the wearable device 100 leaves the skin surface of the user. The capacitance value output by the capacitive sensor 210 indicates that the wearing state of the wearable device 100 is adjacent to the skin surface of the user when the capacitance value is higher than or increases more than a threshold value, while the capacitance value output by the capacitive sensor 210 indicates that the wearing state of the wearable device 100 is not adjacent to the skin surface of the user when the capacitance value is lower than or decreases more than the threshold value.

In another embodiment, the capacitance value output by the capacitive sensor 210 decreases when the wearable device 100 approaches the skin surface of the user and the capacitance value output by the capacitive sensor 210 increases when the wearable device 100 leaves the skin surface of the user. The capacitance value output by the capacitive sensor 210 indicates that the wearing state of the wearable device 100 is adjacent to the skin surface of the user when the capacitance value is lower than or decreases more than a threshold value, while the capacitance value output by the capacitive sensor 210 indicates that the wearing state of the wearable device 100 is not adjacent to the skin surface of the user when the capacitance value is higher than or increases more than the threshold value.

The threshold value can be a constant value or a variable value adapted to real-time detection. For example, the threshold value can be calculated by adding a predetermined value to or subtracting a predetermined value from a previous capacitance value output by the capacitive sensor 210.

The inductive sensor 220 includes a transmitter (TX) coil 223 and a receiver (RX) coil 225. The inductive sensor 220 is configured to provide a current to the transmitter coil 223. When the inductive sensor 220 is energized, an electromagnetic field is formed between the TX coil 223 and the RX coil 225. A metal object moving relative to the inductive sensor 220 disrupts the electromagnetic field and changes an induced current on the RX coil 225. The inductive sensor 220 is configured to detect and output a magnitude variation of the induced current in the RX coil 225 as the detecting result of the inductive sensor 220. When the magnitude variation exceeds (becomes higher or lower than) a threshold value, then a metal object is identified as leaving or approaching the wearable device 100. The metal object affects detecting results of both the capacitive sensor 210 and the inductive sensor 220.

The inductive sensor 220 can detect a metal object but cannot detect the skin surface of the user. However, since a metal object is also an electrical conductor, the inductive sensor 220 can cooperate with the capacitive sensor 210 to differentiate between a metal object and the skin surface of the user so that the detection of the skin sensor 110 is not misled by the metal object. For example, when the detecting results of both the capacitive sensor 210 and the inductive sensor 220 indicate that an electrical conductor is adjacent to the wearable device 100, the skin sensor 110 is able to know that the wearable device 100 is adjacent to a metal object instead of the skin surface of the user, and therefore the skin sensor 110 can determine that the wearing state of the wearable device 100 is not adjacent to the skin surface of the user.

The optical sensor 230 includes a light source 233 and a light sensor 235. The light source 233 is configured to emit light of a single dominant wavelength or a plurality of different dominant wavelengths. For example, in an embodiment, the light source 233 emits visible light and infrared light. The light sensor 235 is configured to detect the intensity of the light emitted by the light source 233 and then reflected by or penetrated through an external object, such as the skin surface of the user. The aforementioned detecting result output by the optical sensor 230 is the light intensity detected by the light sensor 235.

In an embodiment, the light intensity of the light source 233 is higher than the light intensity of the ambient environment. Therefore, the light intensity output by the optical sensor 230 increases when the wearable device 100 approaches the skin surface of the user and the light intensity output by the optical sensor 230 decreases when the wearable device 100 leaves the skin surface of the user.

In another embodiment, the light intensity of the light source 233 is lower than the light intensity of the ambient environment, or the optical sensor 230 does not include the light source 233. Therefore, the light intensity output by the optical sensor 230 decreases when the wearable device 100 approaches the skin surface of the user and the light intensity output by the optical sensor 230 increases when the wearable device 100 leaves the skin surface of the user.

The skin sensor 110 can determine the wearing state of the wearable device 100 by comparing the light intensity or a variation thereof output by the optical sensor 230 with a threshold value. The comparing and the threshold value are similar to those of the capacitive sensor 210.

The PPG sensor 240 includes a light source 243 and a light sensor 245. The light source 243 is configured to emit light of a single dominant wavelength or a plurality of different dominant wavelengths to illuminate the skin of the user. For example, in an embodiment, the light source 243 emits visible light and infrared light. The light sensor 245 is configured to measure the absorption of the light by the skin of the user to detect blood volume changes in capillaries in the skin of the user caused by the blood pulse of each cardiac cycle of the user. Based on the blood volume changes, the PPG sensor 240 is configured to detect a PPG signal including information representing at least one of the heart rate, heartbeats, and cardiac cycles of the user. The aforementioned detecting result output by the PPG sensor 240 is the PPG signal.

In an embodiment, the PPG signal indicates that the wearing state of the wearable device 100 is adjacent to the skin surface of the user when the PPG signal includes the heartbeat waveform of at least one complete cardiac cycle of the user, while the PPG signal indicates that the wearing state of the wearable device 100 is not adjacent to the skin surface of the user when the PPG signal does not include any heartbeat waveform of the user. This is a slower method for determining the wearing state of the wearable device 100 because the PPG sensor 240 needs approximately one second to output the heartbeat waveform of one complete cardiac cycle.

It is also possible to determine the wearing state of the wearable device 100 by calculating a signal-to-noise ratio or comparing amplitudes of the PPG signal with a threshold value. In an exemplary embodiment, the PPG signal indicates that the wearing state of the wearable device 100 is adjacent to the skin surface of the user when a signal-tonoise ratio or an amplitude of the PPG signal is higher than or becomes higher than a threshold value, while the PPG signal indicates that the wearing state of the wearable device 100 is not adjacent to the skin surface of the user when the signal-to-noise ratio or the amplitude of the PPG signal is lower than or becomes lower than the threshold value. This is also a slower method for determining the wearing state of the wearable device 100 because the signal-to-noise ratio and the amplitude need the heartbeat waveform of at least one complete cardiac cycle to calculate.

It is also possible to determine the wearing state of the wearable device 100 by comparing signal values or magnitudes of the PPG signal with a threshold value. In an exemplary embodiment, the PPG signal indicates that the wearing state of the wearable device 100 is adjacent to the skin surface of the user when a signal value or a magnitude of the PPG signal is higher than or becomes higher than a threshold value, while the PPG signal indicates that the wearing state of the wearable device 100 is not adjacent to the skin surface of the user when the signal value or the magnitude of the PPG signal is lower than or becomes lower than the threshold value. This is a much faster method for determining the wearing state of the wearable device 100 because the skin sensor 110 only needs to obtain an instant signal value or an instant magnitude of the PPG signal to determine the wearing state.

In one non-limiting embodiment, the optical sensor 230 is replaced by the PPG sensor 240. That is, the wearable device 100 does not include the optical sensor 230, and the PPG sensor 240 detects and outputs both the light intensity and the PPG signal mentioned above as the detecting result.

In an embodiment, the output device 150 includes a display configured to display the information of the PPG signal so that the user can view at least one of his/her heart rate, heartbeats and cardiac cycles as well as whether the wearable device 100 is adjacent to or leaving from the skin surface of the user indicated by each of the sub-sensors. In addition, the wireless communication device 160 is configured to transmit the PPG signal to an external electronic device for display, analysis, processing, or storage.

The temperature sensor 250 includes a thermocouple or a resistance temperature detector configured to detect and output a temperature value corresponding to the temperature of the skin surface of the user as the detecting result of the temperature sensor 250. The temperature value indicates that the wearing state of the wearable device 100 is adjacent to the skin surface when the difference value between the temperature value and a pre-stored skin temperature is smaller than or becomes smaller than a threshold value, while the temperature value indicates that the wearing state of the wearable device 100 is not adjacent to the skin surface when the difference value between the temperature value and the pre-stored skin temperature is larger than or becomes larger than the threshold value. In another aspect, when a detected temperature value is larger than a predetermined threshold value, it means that the wearable device 100 is in an adjacent state (adjacent to the skin surface of the user); otherwise, the wearable device 100 is in a non-adjacent state (not adjacent to the skin surface of the user).

In an embodiment, the skin sensor 110 includes only one sub-sensor, or the skin sensor 110 is replaced by the only one sub-sensor. For example, the only one sub-sensor is the capacitive sensor 210, the optical sensor 230, the PPG sensor 240, or the temperature sensor 250. The skin sensor 110 is configured to determine the wearing state of the wearable device 100 according to the detecting result output by the only one sub-sensor.

In another embodiment, the skin sensor 110 includes a plurality of sub-sensors. For example, each sub-sensor is the capacitive sensor 210, the inductive sensor 220, the optical sensor 230, the PPG sensor 240, or the temperature sensor 250. The skin sensor 110 is configured to determine that the wearing state of the wearable device 100 is adjacent to the skin surface of the user when all of the detecting results of the sub-sensors indicate that the wearing state of the wearable device 100 is adjacent to the skin surface. The skin sensor 110 is further configured to determine that the wearing state of the wearable device 100 is not adjacent to the skin surface when at least one or a predetermined number of the detecting results of the sub-sensors indicates that the wearing state of the wearable device 100 is not adjacent to the skin surface.

Each single sub-sensor can be affected by interferences in the ambient environment. For example, the capacitive sensor 210 and the inductive sensor 220 can be affected by electrical conductors nearby. The optical sensor 230 and the PPG sensor 240 can be affected by external light sources and ambient brightness. The temperature sensor 250 can be affected by ambient temperatures. Multiple sub-sensors in the skin sensor 110 can make the detection of the skin sensor 110 more reliable by covering each other's weakness.

In another embodiment, the skin sensor 110 does not determine the wearing state of the wearable device 100. Instead, the skin sensor 110 transmits the detecting results of the sub-sensors to the processor 130, and the processor 130 determines the wearing state of the wearable device 100 according to the detecting results in the same way as the skin sensor 110 determines the wearing state in the previous embodiments.

In one non-limiting embodiment, the PPG sensor 240 is not included in the skin sensor 110. Instead, the PPG sensor 240 is a part of the wearable device 100 outside the skin sensor 110. The detection rate of the skin sensor 110 is faster than the detection rate of the PPG sensor 240. The skin sensor 110 does not determine the wearing state of the wearable device 100. Instead, the PPG sensor 240 determines the wearing state of the wearable device 100 according to the PPG signal. More specifically, the PPG sensor 240 determines whether the wearable device 100 is worn on the user (step 302) with a slower (compared with the skin sensor 110) detecting rate; whereas, the skin sensor 110 determines whether the wearable device 100 leaves (step 308) from the skin surface, after the adjacent state is confirmed, with a higher (compared with the PPG sensor 240) detecting rate.

In another embodiment, the PPG sensor 240 is a part of the wearable device 100 outside the skin sensor 110. The wearing state of the wearable device 100 is not determined by the skin sensor 110 or the PPG sensor 240. Instead, the PPG sensor 240 transmits the PPG signal to the processor 130, and the processor 130 determines the wearing state of the wearable device 100 according to the PPG signal in the same way as the PPG sensor 240 determines the wearing state in the previous embodiment.

The flow in FIG. 3 returns to repeat step 302 when the skin sensor 110, the PPG sensor 240 or the processor 130 determines that the wearing state of the wearable device 100 is not adjacent to the skin surface of the user. The flow proceeds to step 304 when the skin sensor 110, the PPG sensor 240 or the processor 130 determines that the wearing state of the wearable device 100 is adjacent to the skin surface of the user.

Next, at step 304, the processor 130 controls the input device 140 of the wearable device 100 to receive an authentication data generated by operations and/or physiological characteristics of the user. The authentication data is for user authentication before executing the predetermined function of the wearable device 100. The predetermined function is an important function exclusive to the owner of the wearable device 100. Therefore, user authentication is necessary to ensure that the current user is the owner of the wearable device 100. For example, the predetermined function is mobile payment, accessing restricted data, or performing restricted electronic transmission with an external electronic device.

For example, the input device 140 includes a keypad, a keyboard, or a touch panel for the user to input a password and the authentication data includes the password.

For example, the input device 140 includes a touch panel. The user can move a finger or a stylus on the touch panel to input a sliding track. The authentication data includes the sliding track.

For example, the input device 140 includes a camera. The user can perform at least one gesture with a part of his/her body (such as a palm or a hand) or his/her entire body. The camera is configured to take at least one image of the at least one gesture. The authentication data includes the at least one image of the at least one gesture. Alternatively, the input device 140 can extract image features from the at least one image of the at least one gesture and the authentication data includes the image features.

For example, the input device 140 includes a biometric sensor or a camera for obtaining a biometric data of the user based on physiological characteristics of the user, such as voiceprint, fingerprint, palm print, palm veins pattern, hand geometry, iris pattern, retina pattern, and/or facial geometry. The authentication data includes the biometric data.

For example, the input device 140 includes at least one of the aforementioned keypad, keyboard, touch panel, camera, and biometric sensor, and the authentication data includes at least one of the aforementioned password, sliding track, image of gesture, image features of image of gesture, and biometric data.

Next, at step 306, the processor 130 performs the aforementioned user authentication by determining whether the authentication data matches with a pre-stored data. The pre-stored data is associated with the identity of the owner of the wearable device 100. For example, the pre-stored data is a password or a digital signature set by the owner or a biometric data based on physiological characteristics of the owner. When the authentication data does not match with the pre-stored data, the user authentication fails and the flow returns to step 302. When the authentication data matches with the pre-stored data, the user passes the authentication successfully and the flow proceeds to step 308.

In an embodiment, the pre-stored data is stored in the wearable device 100. The processor 130 compares the authentication data with the pre-stored data and determines whether the authentication data matches with the pre-stored data according to the result of the comparison.

In another embodiment, the pre-stored data is stored in an external electronic device. The processor 130 obtains the pre-stored data from the external electronic device through the wireless communication device 160, compares the authentication data with the pre-stored data, and determines whether the authentication data matches with the pre-stored data according to the result of the comparison.

In another embodiment, the pre-stored data is stored in an external electronic device. The processor 130 transmits the authentication data to the external electronic device through the wireless communication device 160. The external electronic device compares the authentication data with the pre-stored data and transmits the result of the comparison to the wearable device 100. The processor 130 determines whether the authentication data matches with the pre-stored data according to the result of the comparison.

At step 308, the skin sensor 110 determines whether the wearable device 100 leaves the skin surface of the user regularly or before the predetermined function is executed. The skin sensor 110 can determine a current wearing state of the wearable device 100 according to the current detecting result output by at least one of the sub-sensors of the skin sensor 110. When the current detecting result includes the PPG signal output by the PPG sensor 240, the skin sensor 110 determines the current wearing state according to the signal value or the magnitude of the PPG signal instead of complete cardiac cycles in the PPG signal because the leaving of the wearable device 100 from the skin surface must be detected as soon as possible for security reasons (more details later). When the skin sensor 110 determines that the current wearing state is still adjacent to the skin surface (since step 302), that means the wearable device 100 does not leave the skin surface. When the skin sensor 110 determines that the current wearing state is no longer adjacent to the skin surface, that means the wearing state changes from adjacent to the skin surface (at step 302) to not adjacent to the skin surface (at step 308). In response, the skin sensor 110 determines that the wearable device 100 leaves the skin surface.

In another embodiment, when the detecting result output by a sub-sensor of the skin sensor 110 indicates that the wearing state of the wearable device 100 is still adjacent to the skin surface (since step 302), the detecting result of that sub-sensor indicates that the wearable device 100 does not leave the skin surface. When the detecting result output by a sub-sensor of the skin sensor 110 indicates that the wearing state of the wearable device 100 is no longer adjacent to the skin surface, the detecting result of that sub-sensor indicates that the wearable device 100 leaves the skin surface. The skin sensor 110 is configured to determine that the wearable device 100 does not leave the skin surface when all of the detecting results of the sub-sensors indicate that the wearable device 100 does not leave the skin surface. The skin sensor 110 is further configured to determine that the wearable device 100 leaves the skin surface when at least one of the detecting results of the sub-sensors indicates that the wearable device 100 leaves the skin surface or when at least two of the detecting results of the sub-sensors cannot indicate whether or not the wearable device 100 leaves the skin surface.

In a non-limiting embodiment, the sub-sensors in the skin sensor 110 can be classified into a main sub-sensor and one or more auxiliary sub-sensors. The skin sensor 110 can determine whether the wearable device 100 leaves the skin surface according to the detecting results output by the main sub-sensor and at least one auxiliary sub-sensor. The skin sensor 110 checks the detecting result of the main sub-sensor first and then check the detecting results of the auxiliary sub-sensors. For example, the capacitive sensor 210 is the main sub-sensor and the other sub-sensors are the auxiliary sub-sensors. The skin sensor 110 can check the detecting results of all of the sub-sensors one by one according to a preset order.

When the skin sensor 110 determines that the wearable device 100 leaves the skin surface, the skin sensor 110 sets a notification to notify the processor 130 that the wearable device 100 leaves the skin surface. In an embodiment, the skin sensor 110 includes a register 260 readable by the processor 130. The skin sensor 110 sets the notification by changing the value stored in the register 260 from a first value to a second value. The processor 130 can keep reading the value stored in the register 260 to know whether the wearable device 100 leaves the skin surface of the user. When the value read from the register 260 is the first value, that means the wearable device 100 does not leave the skin surface of the user. When the value read from the register 260 is the second value, that means the wearable device 100 leaves the skin surface of the user.

When the wearable device 100 leaves the skin surface and then approaches the skin surface between steps 302 and 308, the skin sensor 110 does not change the value stored in the register 260 back to the first value. Instead, the skin sensor 110 keeps the second value in the register 260 to ignore the approaching of the wearable device 100 to the skin surface after the leaving from the skin surface so that the wearable device 100 will be determined to leave the skin surface at step 308.

In another embodiment, the register 260 is not implemented. The skin sensor 110 sets the notification by transmitting a notification signal to the processor 130. The processor 130 can know whether the wearable device 100 leaves the skin surface of the user by checking the notification signal. When the processor 130 does not receive the notification signal, that means the wearable device 100 does not leave the skin surface of the user. When the processor 130 receives the notification signal, that means the wearable device 100 leaves the skin surface of the user.

When the wearable device 100 leaves the skin surface and then approaches the skin surface between steps 302 and 308, the skin sensor 110 does not withdraw the notification signal, thus the skin sensor 110 ignores the approaching of the wearable device 100 to the skin surface after the leaving from the skin surface so that the wearable device 100 will be determined to leave the skin surface at step 308.

In another embodiment, the skin sensor 110 does not determine whether the wearable device 100 leaves the skin surface. Instead, the skin sensor 110 transmits the detecting results of the sub-sensors to the processor 130, and the processor 130 determines whether the wearable device 100 leaves the skin surface according to the detecting results in the same way as the skin sensor 110 determines whether the wearable device 100 leaves the skin surface in the previous embodiments. When the wearable device 100 leaves the skin surface and then approaches the skin surface between steps 302 and 308, the processor 130 ignores the approaching of the wearable device 100 to the skin surface after the leaving from the skin surface. In other words, the processor 130 still considers the wearable device 100 as away from the skin surface and the wearable device 100 will be determined to leave the skin surface at step 308.

When the skin sensor 110 or the processor 130 determines that the wearable device 100 leaves the skin surface at step 308, that means the wearable device 100 is taken off from the user and the situation is no longer secure to execute the predetermined function. In response, the flow returns to step 302. When the skin sensor 110 or the processor 130 determines that the wearable device 100 does not leave the skin surface at step 308, that means the user still wears the wearable device 100 and the situation is secure to execute the predetermined function. The flow proceeds to step 310.

At step 310, the processor 130 checks whether a request for executing a predetermined function of the wearable device 100 is generated. The request can be generated by an external electronic device, such as an NFC terminal for mobile payment, and the wearable device 100 can receive the request through the wireless communication device 160. Alternatively, the request can be generated by the user through a command or an operation on the wearable device 100. When the request is not generated, the flow returns to step 308. When the request is generated, the processor 130 receives the request in step 310, and then the processor 130 executes the predetermined function in response to the request at step 312. The processor 130 rejects or ignores the request when the skin sensor 110 or the processor 130 determines that the wearable device 100 leaves the skin surface after the authentication data is received and before the predetermined function is executed.

For example, the predetermined function is mobile payment. The request is generated by an NFC terminal participating in the mobile payment. When the wearable device 100 approaches the NFC terminal, the wearable device 100 receives the request. In response to the request, the wearable device 100 cooperates with the NFC terminal to execute the mobile payment.

In an embodiment, the skin sensor 110 or the processor 130 determines whether the wearable device 100 leaves the skin surface at a fixed detection period (at a fixed detection frequency) during steps 304 to 312. In another embodiment, in addition to the determination at the fixed detection period, there is an additional determination of whether the wearable device 100 leaves the skin surface performed within the fixed detection period right before the execution of the predetermined function at step 312. This additional determination can be inserted between steps 310 and 312 in FIG. 3. When the wearable device 100 leaves the skin surface at any moment between steps 302 and 312, the flow returns to step 302 without executing the predetermined function.

In an embodiment, during the executing of the predetermined function at step 312, the processor 130 continuously checks whether the wearable device 100 leaves the skin surface of the user. As mentioned above, the skin sensor 110 or the processor 130 can determine whether the wearable device 100 leaves the skin surface according to the detecting results of the sub-sensors in the skin sensor 110. When it is the skin sensor 110 that determines whether the wearable device 100 leaves the skin surface, the skin sensor 110 notifies the processor 130 when the wearable device 100 leaves the skin surface. Therefore, the processor 130 can respond quickly to the leaving from the skin surface. When the skin sensor 110 or the processor 130 determines that the wearable device 100 leaves the skin surface during the executing of the predetermined function at step 312, the processor 130 aborts the predetermined function at step 314 by interrupting the execution of the predetermined function immediately regardless of the state and the progress of the execution of the predetermined function. After step 314, the flow returns to step 302.

The flow of the method in FIG. 3 ensures that the processor 130 executes the predetermined function if and only if the user wears the wearable device 100 initially and then passes the authentication successfully, and the user must keep wearing the wearable device 100 until the processor 130 finishes executing the predetermined function. The processor 130 does not execute the predetermined function when the wearable device 100 leaves the skin surface of the user before the processor 130 receives the request at step 310. The processor 130 aborts the predetermined function when the wearable device 100 leaves the skin surface of the user during the executing of the predetermined function at step 312.

Therefore, the processor 130 executes the predetermined function only in a secure state wherein the user successfully passes the authentication and the user keeps wearing the wearable device 100. The sub-sensors in the skin sensor 110 can detect whether the wearable device 100 leaves the skin surface at a high frequency (for example, in a range from 1 KHz to 10 KHz) so that the processor 130 can reject the request or abort the predetermined function immediately after the wearable device 100 is taken off from the authenticated user and an unauthenticated user cannot continue the execution of the predetermined function under the identity of the authenticated user.

In an embodiment, the output device 150 includes a display configured to display user interfaces. The output device 150 displays a first user interface when steps 304 and 306 corresponding to the user authentication are executed and displays a second user interface when step 312 corresponding to the predetermined function is executed. At step 314, the processor 130 aborts the predetermined function by interrupting the execution of the predetermined function immediately and switching the output device 150 from displaying the second user interface to displaying the first user interface or another different user interface. In other words, the predetermined function becomes inaccessible and all information displayed by the predetermined function disappears from the display of the output device 150 after the wearable device 100 is taken off from the authenticated user. In this way, the wearable device 100 can reliably protect the predetermined function and the information associated with the predetermined function from being used or viewed by an unauthenticated user.

For example, the predetermined function is mobile payment. The user passes the authentication, and then the user generates the request for the mobile payment through a command or an operation on the wearable device 100, and then the output device 150 displays a user interface for the mobile payment at step 312. The user interface displays a quick response code (QR code) representing the user so that a seller can scan the QR code to receive the payment from the user. When the wearable device 100 is taken off from the authenticated user before the seller scans the QR code, at step 314 the processor 130 aborts the mobile payment by interrupting the mobile payment immediately and switching the output device 150 to display another interface so that an unauthenticated user cannot continue the payment and cannot see or scan the QR code of the authenticated user.

For another example, the predetermined function is accessing restricted data, such as reading a message, an email, or an important document of the owner of the wearable device 100. The user passes the authentication, and then the user generates the request for accessing restricted data through a command or an operation on the wearable device 100, and then the output device 150 displays a user interface for displaying the message, the email, or the document at step 312. When the wearable device 100 is taken off from the authenticated user, at step 314 the processor 130 aborts the data access by immediately switching the output device 150 to display another interface so that an unauthenticated user cannot see the restricted data.

For another example, the predetermined function is performing restricted electronic transmission, such as performing a data access transaction with an external database. The user passes the authentication, and then the user generates the request for the data access transaction through a command or an operation on the wearable device 100, and then the output device 150 displays a user interface for accessing the data in the external database at step 312. When the wearable device 100 is taken off from the authenticated user, at step 314 the processor 130 aborts the data access transaction by rolling back the data access transaction and terminating the electronic connection between the wearable device 100 and the external database. The rolling back means restoring all data modified in the data access transaction to their original values before the data access transaction. In addition, the processor 130 switches the output device 150 to display another interface so that an unauthenticated user cannot see the data in the external database.

In an alternative embodiment, the term "the wearing state of the wearable device 100 is adjacent to the skin surface of the user" can be replaced by the term "the wearable device 100 is adjacent to the skin surface of the user", and the term "the wearing state of the wearable device 100 is not adjacent to the skin surface of the user" can be replaced by the term "the wearable device 100 is not adjacent to the skin surface of the user".

As mentioned above, the skin sensor 110, the PPG sensor 240 or the processor 130 can determine whether the wearing state of the wearable device 100 is adjacent to the skin surface of the user according to the detecting results output by the stand-alone PPG sensor 240 or the sub-sensors in the skin sensor 110. The term "adjacent to" means the wearable device 100 is within a preset distance, such as one millimeter or two millimeters, from the skin surface. In another embodiment, the preset distance can be zero, which means the skin sensor 110, the PPG sensor 240 or the processor 130 is configured to determine whether the wearable device 100 is attached to or in contact with the skin surface of the user. Therefore, the term "adjacent to" in the previous embodiments can be replaced with the term "attached to" or the term "in contact with", and the term "not adjacent to" in the previous embodiments can be replaced with the term "not attached to", the term "not in contact with" or the term "leave".

In brief, the wearable device detects an attached status with a user to determine whether the wearable device is properly worn by a user to improve confidence of the detected result. Many technologies can be applied to perform this function. Such as by using a pressure sensor to detect the tension of a belt for fixing the wearable device on the user's body, or to detect the pressure on the user's skin when the wearable device is wear tightly. Or, by using a capacitive sensor to detect the proximity between the wearable device and the user's skin, the attached status is confirmable. Or, by using a humidity sensor to detect the slight sweat between the wearable device and user's skin, the attached status is confirmable. Or, by using a thermal sensor to detect the temperature change between the wearable device and user's skin, the attached status is confirmable.

In order to determine whether the attached status is good or not, a processor of the wearable device, e.g., a digital processing unit (DSP) or an application specific integrated circuit (ASIC), compares the detected result (e.g., including pressure, capacitance change, humidity or temperature) of the above sensors with a predetermined threshold, which is previously determined corresponding to a type of sensor. When a variation of the detected result exceeds the predetermined threshold, the attached status is determined to have a change between an attached state and a lift up state.

In other aspects, the wearable device confirms the attached status by analyzing intensity of light passing through different polarizers and detected by a detection module, by analyzing intensity of different light wavelengths detected by the detection module, by analyzing intensity distribution of an image frame detected by the detection module, and by calculating a time-of-flight according to signals (e.g., avalanche current) detected by a single photon avalanche photodiode (SPAD).

When the user removes the wearable device from his/her body, the wearable device can then detect the status change, and stops generating a confirmed signal if a lift up state is confirmed. The confirmed signal is to indicate a correct user ID being authenticated.

In the above embodiments, the wearable device is arranged to identify a user ID according to the biometric characteristic of the user. In an alternatively embodiment, the wearable device is arranged to identify the user ID according to a user input which includes a password, a gesture, knocks and/or a speech sentence. That is, the biometric characteristic being detected by the wearable device is replaced by the user input.

In an aspect that uses the password as a user input, the wearable device includes a keyboard or a touch panel to receive a set of password inputted by a current user. The wearable device then compares the inputted password with a set of pre-stored password to confirm the user ID of the current user. The pre-stored password is preferably set or selected by the same user in a setting procedure and stored in a memory of the wearable device.

In an aspect that uses the gesture as a user input, the wearable device includes a touch panel or an optical gesture detector to detect a gesture inputted by a current user, e.g., using his or her finger(s). For the touch panel, the current user draws the gesture on the touch panel; whereas for the optical gesture detector, the user draws the gesture (e.g., moving finger) in the space in front of the optical gesture detector. The wearable device then compares the inputted gesture with a pre-stored gesture to confirm the user ID of the current user. The pre-stored gesture is preferably set or performed by the same user in a setting procedure and stored in a memory of the wearable device.

In an aspect that uses the knocks as a user input, the wearable device includes a gyro or a 2D or 3D acceleration sensor to detect knocking signals inputted by a current user. The wearable device then compares the inputted knocking signals with pre-stored knocking signals to confirm the user ID of the current user. The pre-stored knocking signals have a predetermined pattern. As long as the inputted knocking signals have a same pattern with the predetermined pattern, the wearable device confirms the user ID. The pre-stored knocking signals (or predetermined pattern) is preferably inputted or performed by the same user in a setting procedure and stored in a memory of the wearable device.

In an aspect that uses the speech sentence as a user input, the wearable device includes a microphone to receive a speech sentence said by a current user. The wearable device then compares the said speech sentence (including numbers and/or words) with a pre-stored speech sentence to confirm the user ID of the current user. The pre-stored speech sentence is preferably inputted or recorded by the same user in a setting procedure and stored in a memory of the wearable device. That is, the wearable device has the language processing function to process the speech sentence inputted via the microphone and identifies whether the inputted speech sentence matches a predetermined speech sentence, like an audio password, to identify the user ID.

In another embodiment, the continuously detected heartbeat is expanded to include continuously detected attached status. The attached status is detected by detecting at least one of a heartbeat, capacitance using a capacitive sensor, light intensity using an optical sensor, a temperature using a thermal sensor, sweat using a humidity sensor. More specifically, the heartbeat being continuously detected is used as one example to refer that the wearable accessary is continuously being worn by a user. Other methods for confirming the wearable accessary being continuously worn may be used. The change of the attached status from contact to non-contact is detectable by detecting a value change of the above parameters, including with/without heartbeat, capacitance variation, light intensity variation, capacitance variation, temperature variation, humidity variation or the like. The parameter variation is compared with a predetermined parameter to confirm the change of attached status.

The wearable device 100 of the present disclosure is selected to operate in a first mode or a second mode, wherein the first mode and the second mode are respectively entered in different time intervals. In one aspect, the processor 130 selects to enter the first mode or the second mode according to a touch or a slip on a touch panel of the wearable device 100. In another aspect, the processor 130 selects to enter the first mode or the second mode according to a press on a key of the wearable device 100. In an alternative aspect, the processor 130 selects to enter the first mode or the second mode according to a rotation of a knob of the wearable device 100.

In the first mode, the processor 130 performs the above contact detection and predetermined function, including e.g., determining whether the wearable device 100 is in contact with a skin surface of a user according to a PPG signal generated by a PPG sensor 240, receiving an authentication data for authenticating the user when the wearable device 100 is determined to be in contact with the skin surface, executing a predetermined function for the user in response to a request when the authentication data matches a pre-stored data and the wearable device 100 is determined to be still in contact with the skin surface, and rejecting or ignoring the request when the wearable device 100 is determined to be no longer in contact with the skin surface after the authentication data is received and before the predetermined function is executed. Details of these steps have been illustrated above, and thus are not repeated herein.

In the second mode, the processor 130 generates an average blood pressure using the PPG signal generated by the PPG sensor 240 as described below.

Figure 5:
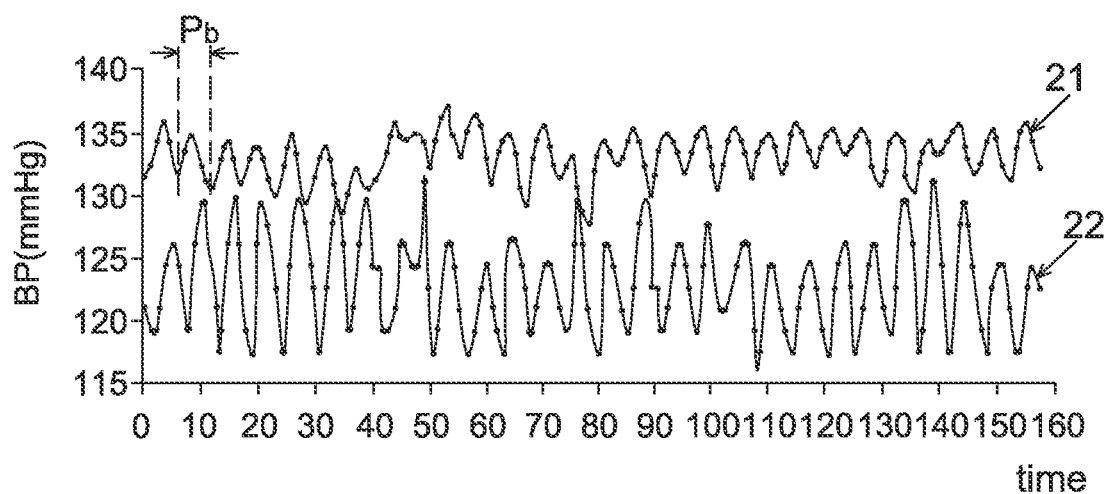
FIG. 5 is a schematic diagram of blood pressures obtained by a blood pressure estimation model according to one embodiment of the present disclosure.

One aspect of obtaining the blood pressure and the respiration cycle Pb (as shown in FIG. 5) from a PPG signal to accordingly generate the average blood pressure is illustrated hereinafter.

Figure 4:
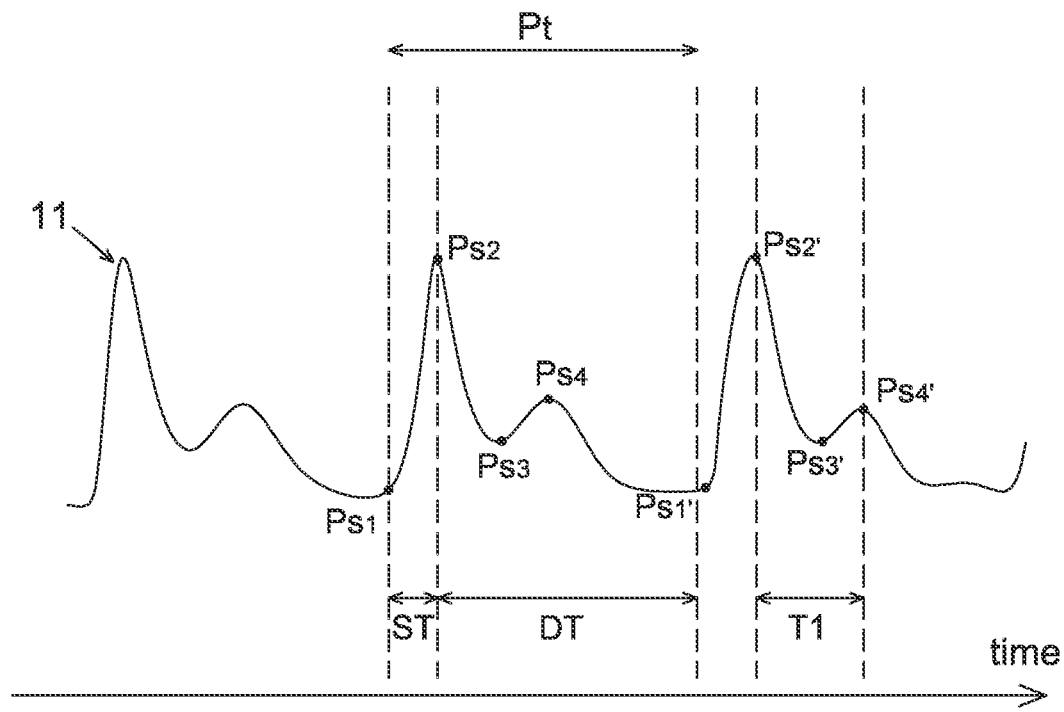
FIG. 4 is a schematic diagram of a photoplethysmography (PPG) signal detected by a wearable device according to one embodiment of the present disclosure.

Firstly, a PPG signal as shown in FIG. 4 is obtained by a PPG sensor 240 of the wearable device 100 according to samples acquired at a sampling frequency of the PPG sensor 240, wherein the sampling frequency is within a range between, e.g., 1 KHZ and 10 KHZ, much higher than the heartbeat. These samples form a curve of a PPG signal 11 in FIG. 4, e.g., connecting these samples with line segments to form the continuous curve. In addition to performing different functions in different modes as mentioned above, in another aspect the processor 130 selects a first part of the samples of the PPG signal to perform the contact detection as described above and selects a second part of the samples of the PPG signal to generate an average blood pressure as described below. For example in one aspect, the processor 130 determines whether the wearable device 100 is in contact with a skin surface of a user using an odd (or even) number of the samples of the PPG signal, but calculates the blood pressure and the respiration cycle using an even (or odd) number of the samples of the PPG signal. That is, the processor 103 uses interlaced samples to respectively perform different functions since the sampling frequency is set high enough compared to the heartbeat.

It is seen from FIG. 4 that the PPG signal 11 includes a plurality of feature points PS1-PS4, PS1'-PS4'. Next, it is able to obtain at least one blood pressure, as shown in FIG. 5, corresponding to each pulse duration Pt by recognizing a time difference between two feature points of the PPG signal 11 and using an estimation model (described below). FIG. 5 shows a continuous blood pressure signal formed by connecting a plurality of blood pressures with line segments, wherein the numeral 21 is a systolic blood pressure signal and the numeral 22 is a diastolic blood pressure signal.

In one aspect, the wearable device 100 is further able to identify a rising part and a falling part of the blood pressure signals 21 and 22. As shown in FIG. 5, the rising part represents a breathe-in and the falling part represents a breathe-out. In other aspects, corresponding to different estimation models, it is possible that the rising part represents a breathe-out and the falling part represents a breathe-in. After the above information is obtained, it is able to further calculate a respiration rate according to the blood pressure signals 21, 22 and to real-timely output at least one of the blood pressure signals and the respiration rate. In addition, it is possible to generate a prompt for the user's reference from a prompting device according to a comparison of comparing the blood pressure and/or respiration cycle with at least one threshold.

Therefore, by using the wearable device 100 of the present disclosure, it is able to help a user to understand his/her physiological states more and achieve the effect of self-adjustment.

The present disclosure is also able to record user's blood pressures and breathing states for a long period of time to provide statistical data to the user as a reference for the self-adjustment, and it is possible to further determine thresholds according to said statistical data.

Figures 6A, 6B:
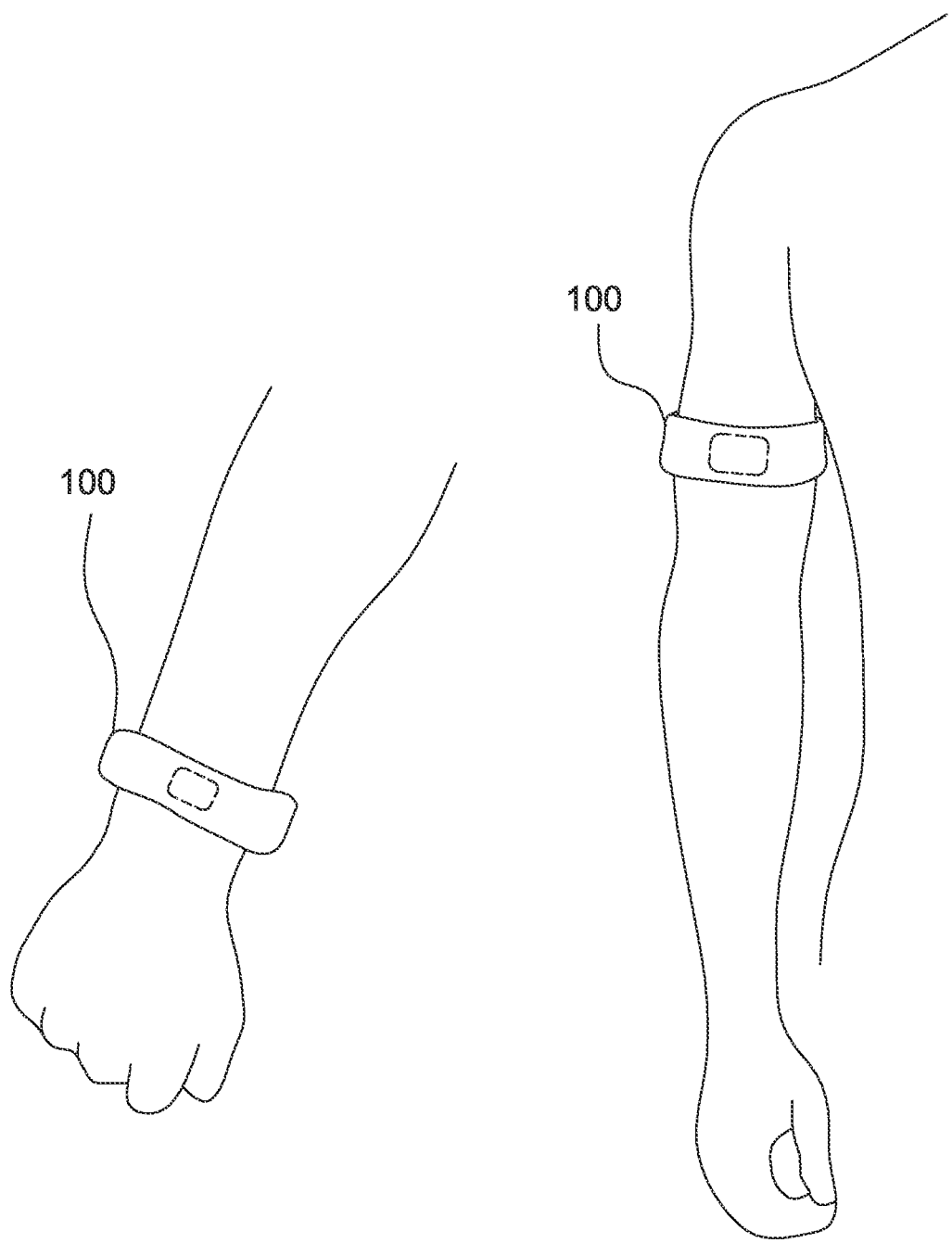
FIGS. 6A and 6B are usage states of a wearable device according to some embodiments of the present disclosure.

Please referring to FIGS. 6A and 6B, they are usage states of a wearable device 100 according to some embodiments of the present disclosure. The wearable device 100 analyzes and displays the variation of a user's blood pressure signal changed with time by detecting a PPG signal of the user's skin tissues. Accordingly, the wearable device 100 is able to be arranged at any suitable location for detecting the PPG signal, e.g., setting on the user's wrist (FIG. 6A) or the user's arm (FIG. 6B), but not limited thereto. In another aspect, the wearable device 100 is selected from, e.g., a bracelet, an armband, a ring, a foot ring, a foot bracelet, a cell phone, an earphone, a headphone and a personal digital assistant (PDA) which contacts at least a part of skin surface of a user. In addition, the wearable device 100 is able to be coupled to a medical device, a home appliance, a vehicle, a security system in a wired or wireless manner Preferably, the one connected with the wearable device 100 includes a display device to real-timely display a detection result of the wearable device 100.

Figure 7:
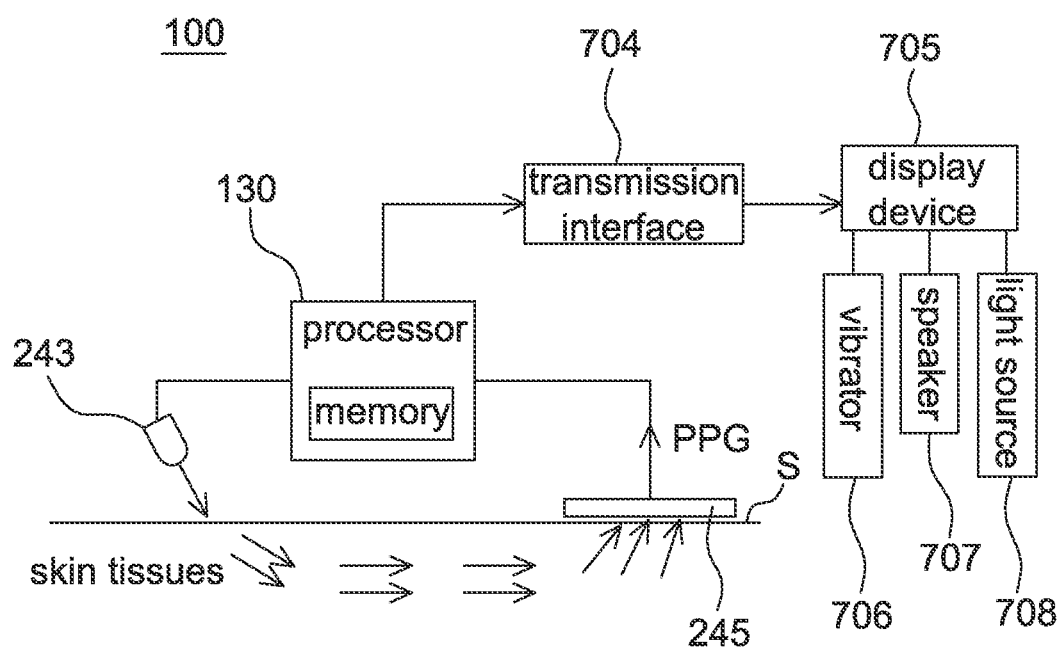
FIG. 7 is a schematic block diagram of a wearable device according to one embodiment of the present disclosure.

Please referring to FIG. 7, it is a schematic block diagram of a wearable device 100 according to another embodiment of the present disclosure. The wearable device 100 includes a light source 243, a light sensor 245 and a processor 130. As mentioned above, the light source 243 and the light sensor 245 form a PPG sensor. In some aspects, the wearable device 100 further includes a display device 705 for displaying a detection result of the wearable device 100. In some aspects, the wearable device 100 further includes a transmission interface 704 coupled to an external display device 705 in a wired or wireless manner to output the detection result of the wearable device 100 to the display device 705 to be real-timely displayed. In other words, the display device 705 may or may not be included in the wearable device 100 depending on different applications.

Figure 8:
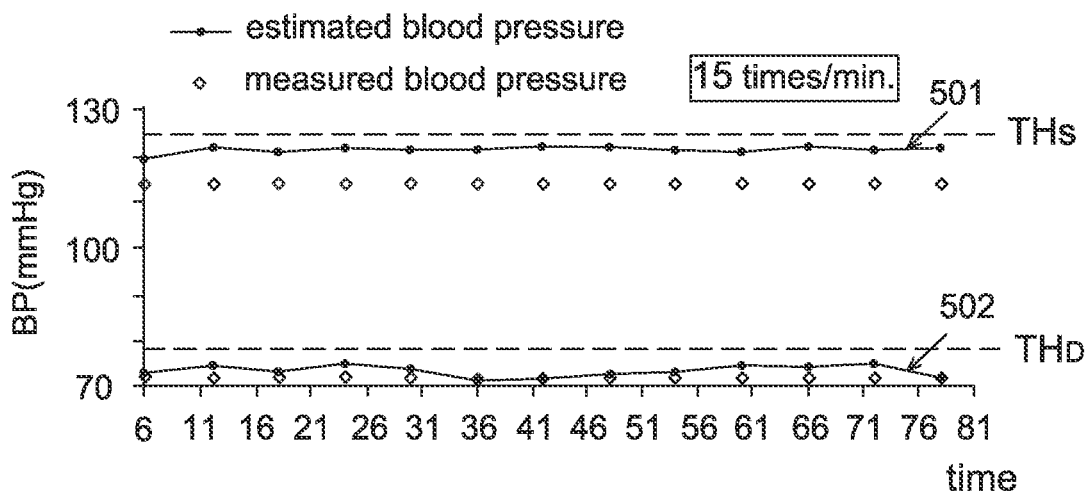
FIG. 8 is a schematic diagram of average blood pressures according to one embodiment of the present disclosure.

The display device 705 is, for example, a liquid-crystal display (LCD), a plasma display panel (PDP), an organic light-emitting diode (OLED) display or a projector for displaying images as long as it is able to display average blood pressures 501 and 502 (described later) as shown in FIG. 8 on a screen.

The light source 243 is, for example, a light emitting diode or a laser diode, and used to emit light adapted to penetrate and be absorbed by skin tissues. For example, a wavelength of light emitted by the light source 243 is about 610 nm or 910 nm, but not limited thereto. The light source 243 illuminates a skin surface S to cause light to pass through skin tissues under the skin surface S. Preferably, the wearable device 100 includes a transparent surface to be attached to the skin surface S in operation and for protecting the light source 243, and the light source 243 is arranged at an inner side of the transparent surface. The transparent surface is made of transparent materials, e.g., plastic or glass, without particular limitations. In some aspects, the transparent surface is a surface of a light guide which has the function of guiding light paths.

In some aspects, when the wearable device 100 is also used to detect the blood oxygenation, the wearable device 100 includes two light sources to respectively emit light of different wavelengths, wherein a method of detecting the blood oxygenation may be referred to U.S. application Ser. No. 13/614,999 assigned to the same assignee of the present application, and the full disclosure of which is incorporated herein by reference.

The light sensor 245 is, for example, a photodiode or an image sensor array, e.g., a CMOS sensor array, and used to detect ejected light from the skin tissues to generate a PPG signal, shown as 11 in FIG. 4 for example. The method of detecting and outputting a PPG signal by a photodiode is known to the art and thus details thereof are not described herein. The present disclosure is to identify the blood pressure and the respiration rate according to the detected PPG signal. A method of detecting a three dimensional physiology distribution by an image sensor array may be referred to U.S. application Ser. No. 14/955,463 assigned to the same assignee of the present application, and the full disclosure of which is incorporated herein by reference. Each pixel of the image sensor array respectively outputs the PPG signal mentioned herein, or an intensity summation of all pixels of the image sensor array is used as the PPG signal mentioned herein. Similarly, the light sensor 245 is arranged inside of the transparent surface.

The processor 130 is electrically coupled to the light source 243 and the light sensor 245 to control the light source 243 and the light sensor 245 to operate correspondingly. The processor 130 calculates a blood pressure corresponding to each pulse duration Pt according to at least one blood pressure estimation model as well as a time difference between two feature points in one pulse duration Pt of the PPG signal 11, calculates a respiration cycle Pb, and averages a plurality of blood pressures within the respiration cycle Pb to generate an average blood pressure. In one aspect, the average blood pressure is a relative value with respect to a real blood pressure of a user. The user is able to understand his/her blood pressure change according to the average blood pressure.

In one aspect, the at least one blood pressure estimation model includes a polynomial taking the time difference between two feature points within one pulse duration Pt as a variable, wherein the polynomial is a linear polynomial, a quadratic polynomial or a higher order polynomial obtained by fitting a curve between the two feature points within the pulse duration Pt by a fitting method. The blood pressure estimation model is implemented by software and/or hardware, and integrated in the processor 130.

For example in FIG. 4, a plurality of feature points PS1-PS4 are included within one pulse duration Pt, and said two feature points are selected from two of a maximum value PS2, a second maximum value PS4, a minimum value PS1 and a second minimum value PS3 within the pulse duration Pt of the PPG signal 11. In addition, the at least one blood pressure estimation model includes an estimation model for systolic pressure (SBP) and an estimation model for diastolic pressure (DBP).

The fitting method is used to fit the curve, for example, between the feature points PS1 and PS2, between the feature points PS2 and PS3, between the feature points PS3 and PS4, between the feature points PS2 and PS1' or between the feature points PS2 and PS4 without particular limitations.

For example, one estimation model for systolic pressure is an equation (1) obtained according to the curve between the two feature points PS2 and PS1' (PS1' being the minimum value within a next pulse duration Pt), wherein a time difference between the feature points PS2 and PS1' is indicated as DT.

$$SBP = -0.095 \times DT + 188.581 \quad (1)$$

One estimation model for diastolic pressure is an equation (2) obtained according to the curve between the two feature points PS2 and PS4, wherein a time difference between the feature points PS2 and PS4 is indicated as T1. To clearly show the time difference, T1 is shown by a time difference between the feature points PS2' and PS4' in FIG. 4, i.e., assuming time differences between feature points PS2' and PS4' and between feature points PS2 and PS4 being identical.

$$DBP = -0.344 \times T1 + 174.308 \quad (2)$$

The above diastolic blood pressure model and systolic blood pressure model are only intended to illustrate and able to obtain rough values of the blood pressure corresponding to the measured PPG signal. If a more precise model is required, it is possible to use other mathematical models without particular limitations, e.g., using a higher order polynomial having more variables or more different time differences.

For example, it is possible to represent the SBP and DPP by an equation $\Sigma a_k X_k K + C$, wherein $X_k$ indicates a time difference and C is a known constant.

One estimation model for systolic pressure and one estimation model for diastolic pressure are obtainable between arbitrary two feature points, and only values of the estimated blood pressure are different. In this aspect, the estimation model for systolic pressure and the estimation model for diastolic pressure are preferably a common model obtained by gathering statistics of PPG signals of some people before shipment and stored in a nonvolatile memory of the processor 130. It should be mentioned that said feature points are not limited to those given in the present disclosure but determined by positions in the PPG signal that correspond to maximum/minimum values in a linear differential curve or a quadratic differential curve of the PPG signal. In addition, a number of feature points for determining the blood pressure estimation model is not limited to 2.

The processor 130 obtains one systolic blood pressure respectively corresponding to each pulse duration Pt, for example, using the equation (1) to form a systolic blood pressure signal 21 as shown in FIG. 5, wherein each dot in the systolic blood pressure signal 21 is one systolic blood pressure obtained by the equation (1), and these dots are connected by line segments. The processor 130 obtains one diastolic blood pressure respectively corresponding to each pulse duration Pt, for example, using the equation (2) to form a diastolic blood pressure signal 22 as shown in FIG. 5, wherein each dot in the diastolic blood pressure signal 22 is one diastolic blood pressure obtained by the equation (2), and these dots are also connected by line segments.

In this aspect, the processor 130 further calculates a respiration cycle Pb according to the systolic blood pressure signal 21 and/or the diastolic blood pressure signal 22. In one aspect, the processor 130 uses a fast Fourier transform (FFT) to convert a plurality of blood pressures of the systolic blood pressure signal 21 and/or the diastolic blood pressure signal 22 to a frequency domain and then obtains the respiration cycle Pb. In another aspect, the processor 130 calculates the respiration cycle Pb using a time difference between two adjacent peak blood pressures among a plurality of blood pressures of the systolic blood pressure signal 21 and/or the diastolic blood pressure signal 22. In other words, it is possible to take a period of the systolic blood pressure signal 21 and/or the diastolic blood pressure signal 22 as the respiration cycle Pb.

It is seen from FIG. 5 that the systolic blood pressure signal 21 and the diastolic blood pressure signal 22 obtained by the processor 130 change with the breathing of a user and are unstable in amplitude. Accordingly, the processor 130 further calculates an average value (e.g., the root-mean-square, but not limited to) of a plurality of blood pressures within the respiration cycle Pb so as to obtain the average blood pressure as shown in FIG. 8, wherein the numeral 501 is referred to the systolic blood pressure and the numeral 502 is referred to the diastolic blood pressure. FIG. 8 is obtained by setting the respiration cycle Pb as 6 seconds. The interval of the respiration cycle Pb is different according to different scenarios. It can been seen from FIG. 8 that the average blood pressure shown in FIG. 8 is much more stable than the blood pressure in FIG. 5.

Referring to FIG. 8 again, it further shows a plurality of measured blood pressures measured by a hemadynamometer. As mentioned above, the wearable device 100 of the present disclosure measures relative blood pressures. In some embodiments, the memory further stores at least one calibration value, wherein the calibration value is a difference value between a measured blood pressure by a hemadynamometer and an estimated blood pressure calculated by the blood pressure estimation model of the present disclosure. Accordingly, after the processor 130 obtains the estimated blood pressure (e.g., the average blood pressure 501 and 502), the calibration value is added to or subtracted from the estimated blood pressure for calibration thereby obtaining a more accurate individualized blood pressure, i.e. calibration values are measured and stored corresponding to different users respectively so as to obtain individualized calibration values.

The transmission interface 704 outputs at least one of the average blood pressure and a respiration rate in a wired or wireless manner, e.g., outputting data of at least one of the average blood pressure and a respiration rate at a predetermined frequency to a display device 705 for real-time display, wherein said wired and wireless transmission techniques are known to the art and thus details thereof are not described herein. The respiration rate is obtainable according to the respiration cycle Pb, e.g., a reciprocal of the respiration cycle Pb multiplied by 60 seconds. It is appreciated that when the wearable device 100 also includes the display device 705, the transmission interface 704 is not implemented, or the transmission interface 704 is arranged inside the wearable device 100 between the processor 130 and the display device 705.

The display device 705 real-timely displays a variation curve of the average blood pressure (e.g., the estimated blood pressures 501 and 502 shown in FIG. 8) changed with time and/or values of the respiration rate. In addition, the processor 130 further reads at least one blood pressure threshold $TH_S$, $TH_D$ associated with the blood pressure from the memory, and sends the read values to the display device 705 directly or via the transmission interface 704 to be displayed thereon. For example, lines, numbers or graphics are shown on a screen of the display device 705 to mark the blood pressure thresholds $TH_S$, $TH_D$ and values of the respiration rate to allow a user to easily observe his/her blood pressures and breathing states from the display device 705.

Different from conventional blood pressure detection devices, the wearable device 100 of the present disclosure is able to real-timely display the blood pressure and breathing state of a user. In other words, as the wearable device 100 analyzes a PPG signal detected by the PPG sensor 240, when the processor 130 receives the PPG signal, the processor 130 starts to analyze and output the blood pressure signals 21 and 22 and/or the respiration rate to the display device 705 to be displayed thereon. As the processor 130 averages the blood pressure signals 21 and 22 by the respiration cycle Pb, the display device 705 is able to display blood pressures after one respiration cycle Pb. Generally, under normal condition, the respiration cycle Pb is about 5 to 6 seconds. It is appreciated that different users have different respiration cycles Pb, and different scenarios have different respiration cycles Pb. In other aspects, when the processor 130 does not calculate the average blood pressure, the display device 705 real-timely displays, for example, blood pressure signals 21 and 22 as shown in FIG. 5.

In addition, to improve the user experience, the wearable device 100 further includes a prompt device to output a prompt signal according to a comparison of comparing at least one threshold with the average blood pressure and/or respiration cycle, wherein the prompt signal is, e.g., a vibration signal, a light signal, an audio signal and/or an image signal without particular limitations as long as the user can be informed.

The wearable device 100 of the present disclosure is applicable to adjusting the emotion as well as the work and rest.

For example, when a user's average blood pressure does not reach or exceeds the blood pressure thresholds $TH_S$ and $TH_D$, the prompt device outputs a prompt signal. Accordingly, the user changes emotion, takes medicine, puts on or takes off clothes and so on to cause the average pressure to return to a normal status.

For example, when a user's respiration rate does not reach or exceeds a threshold, the prompt device outputs a prompt signal. A frequency value of the respiration rate and the estimated blood pressures 501 and 502 are shown together on a screen. As mentioned above, the processor 130 is able to obtain the respiration rate within one respiration cycle Pb without accumulating count values for a whole minute.

The indicating method of the prompt signal is determined according to different applications.

For example, the display device 705 may also be used as the prompt device. When the average blood pressure and/or the respiration rate exceed or do not reach the threshold, the processor 130 provides image signals to the display device 705 to make the display device 705 display the prompt, e.g., by words, graphs, brightness and so forth.

For example, the wearable device 100 further includes a vibrator 706 as the prompt device. When the average blood pressure and/or the respiration rate exceed or do not reach the threshold, the processor 130 provides vibration signals to the vibrator 706 to make the vibrator 706 generate vibrations to warn the user.

For example, the wearable device 100 further includes a speaker 707 as the prompt device. When the average blood pressure and/or the respiration rate exceed or do not reach the threshold, the processor 130 provides voice signals to the speaker 707 to make the speaker 707 generate sounds to warn the user.

For example, the wearable device 100 further includes a warning light source 708 used as the prompt device. When the average blood pressure and/or the respiration rate exceed or do not reach the threshold, the processor 130 provides optical signals to the warning light source 708 to make the warning light source 708 illuminate light to warn the user.

In some aspects, the processor 130 is built-in, for example, a learning algorithm (e.g., implemented by software and/or hardware), to determine the above thresholds, e.g., blood pressure threshold and the respiration rate threshold, but not limited thereto, according to the user's historical records. For example, the thresholds are divided into sleep time, work time, sports time and so forth. Information related to the historical records is stored in, for example, a non-volatile memory.

Figure 9:
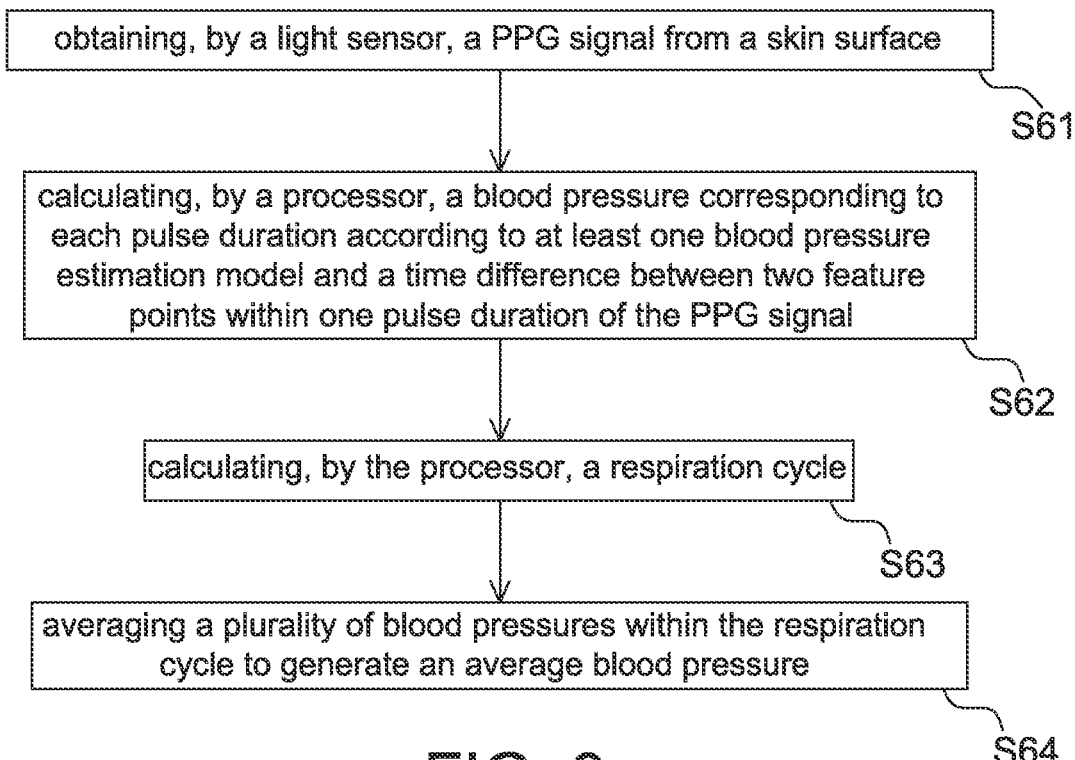
FIG. 9 is a flow chart of an operating method of a wearable device according to one embodiment of the present disclosure.

Please referring to FIG. 9, it is a flow chart of an operating method of a wearable device 100 according to one embodiment of the present disclosure, which includes the steps of: obtaining, by a light sensor, a PPG signal from a skin surface (step S61); calculating, by a processor, a blood pressure corresponding to each pulse duration according to at least one blood pressure estimation model and a time difference between two feature points within one pulse duration of the PPG signal (step S62); calculating, by the processor, a respiration cycle (step S63), and averaging, by the processor, a plurality of blood pressures within the respiration cycle to generate an average blood pressure (step S64).

Step S61: The wearable device 100 is preferably fixed with respect to a skin surface S in operation such that a PPG signal detected by the light sensor 245 of the PPG sensor 240 is not affected by noises due to movement. In addition, the processor 130 is further built-in with an algorithm for eliminating the noises in PPG signals caused by the movement, wherein a method of eliminating motion noises may be referred to U.S. application Ser. No. 13/614,999 assigned to the same assignee of the present application, and the full disclosure of which is incorporated herein by reference.

Step S62: The processor 130 starts to identify feature points within one pulse duration Pt (e.g., PS1-PS4 in FIG. 4) of a PPG signal right after receiving the PPG signal from the light sensor 245 of the PPG sensor 240, wherein said identifying is implemented by software and/or hardware. At least one blood pressure estimation model is pre-stored in a memory, wherein the at least one blood pressure estimation model includes a polynomial using a time difference between two feature points within one pulse duration Pt as a variable, e.g., equations (1) and (2). The processor 130 puts the time differences (e.g., ST, DT, T1) between the measured feature points PS1-PS4 into the at least one blood pressure estimation model to calculate a blood pressure corresponding to each pulse duration Pt, as shown in FIG. 5.

Steps S63-S64: After obtaining a plurality of blood pressures, the processor 130 calculates a respiration cycle Pb (as shown in FIG. 5) directly in the time-domain or calculates the respiration cycle Pb in the frequency domain by using the fast Fourier transform (FFT). In this aspect, the respiration cycle Pb is for calculating a respiration rate to be displayed by the display device 705 and for averaging a plurality of blood pressures calculated by the processor 130 to obtain the estimated blood pressures 501 and 502 as shown in FIG. 8.

Next, the respiration rate and/or the estimated blood pressures 501 and 502 are sent to a display device 705 to be real-timely displayed thereon. In addition, the processor 130 further compares the respiration rate and/or the estimated blood pressures 501, 502 with at least one threshold to confirm whether values thereof are within a normal range to accordingly generate a prompt signal.

In some aspects, to obtain personalized blood pressures, a difference value between an estimated blood pressure and a measured blood pressure of a hemadynamometer is stored in a memory to be used as a calibration value, wherein the calibration value is stored by an application (APP) in a calibration stage, e.g., a user inputting the difference value between the estimated blood pressures and measured blood pressures in FIG. 8 into a user interface to be stored. During operation, the processor 130 automatically calibrates the estimated blood pressures 501 and 502 with the stored calibration value.

It should be mentioned that, it is possible that the display device 705 displays the estimated blood pressures 501, 502 and the respiration rate but does not display the measured blood pressures. In some aspects, the display device 705 further displays the systolic blood pressure signal 21 and/or the diastolic blood pressure signal 22 depending on applications thereof.

It should be mentioned that although the above aspects take the reflective optical PPG sensor as an example, it is only intended to illustrate but not to limit the present disclosure. In other aspects, the PPG sensor is a transmissive optical device in which disposed positions of the light source and the light sensor are different from the above aspects but the sensing theory is not changed, and thus details thereof are not repeated herein.

It should be mentioned that in the above aspects a memory disposed in the processor 130 is taken as an example for illustration purposes, but the present disclosure is not limited thereto. In other aspects, the memory 130 is located outside of the processor 130 without particular limitations as long as the processor 130 is able to access the memory.

In addition, in some aspects, when the processor 130 identifies that the variation of obtained blood pressures (e.g., the standard deviation) exceeds a predetermined range, the calculation of the average blood pressure or the outputting of estimated blood pressures being obtained is stopped till the obtained blood pressures return to the predetermined range.

Although the disclosure has been explained in relation to its preferred embodiment, it is not used to limit the disclosure. It is to be understood that many other possible modifications and variations can be made by those skilled in the art without departing from the spirit and scope of the disclosure as hereinafter claimed.

What is claimed is:

1. A wearable device, comprising:
a photoplethysmography (PPG) sensor configured to generate a PPG signal; and
a processor, configured to
receive an authentication data for authenticating a user when the wearable device is determined to be in contact with a skin surface of the user according to the PPG signal,
execute a predetermined function for the user in response to a request when the authentication data matches a pre-stored data and the wearable device is determined to be still in contact with the skin surface according to the PPG signal, and
reject or ignore the request when the wearable device is determined to be no longer in contact with the skin surface according to the PPG signal after the authentication data is received and before the predetermined function is executed,
wherein the processor is further configured to
calculate at least one blood pressure corresponding to each pulse duration according to at least one blood pressure estimation model and a time difference between two feature points within one pulse duration of the PPG signal, and
average calculated blood pressures within a predetermined time interval to generate an average blood pressure.

2. The wearable device of claim 1, wherein the at least one blood pressure estimation model comprises a polynomial using the time difference between the two feature points within the one pulse duration as a variable.

3. The wearable device of claim 1, wherein the two feature points are two of a maximum value, a second maximum value, a minimum value and a second minimum value within the pulse duration of the PPG signal.

4. The wearable device of claim 1, wherein the processor is further configured to calculate a respiration cycle according to a plurality of blood pressures using a fast Fourier transform.

5. The wearable device of claim 1, wherein the processor is further configured to calculate a respiration cycle using a time difference between two adjacent minimum blood pressures among a plurality of blood pressures.

6. The wearable device of claim 1, wherein the at least one blood pressure estimation model comprises an estimation model for systolic pressure and an estimation model for diastolic pressure.

7. The wearable device of claim 1, wherein the predetermined function comprises mobile payment, accessing restricted data, and performing restricted electronic transmission.

8. A wearable device, comprising:
a photoplethysmography (PPG) sensor configured to generate a PPG signal; and
a processor, configured to enter a first mode or a second mode, wherein
in the first mode, the processor is configured to
receive an authentication data for authenticating a user when the wearable device is determined to be in contact with a skin surface of the user according to the PPG signal,
execute a predetermined function for the user in response to a request when the authentication data matches a pre-stored data and the wearable device is determined to be still in contact with the skin surface according to the PPG signal, and
reject or ignore the request when the wearable device is determined to be no longer in contact with the skin surface according to the PPG signal after the authentication data is received and before the predetermined function is executed, and in the second mode, the processor is configured to
calculate at least one blood pressure corresponding to each pulse duration according to at least one blood pressure estimation model and a time difference between two feature points within one pulse duration of the PPG signal, and
average calculated blood pressures within a predetermined time interval to generate an average blood pressure.

9. The wearable device of claim 8, wherein the at least one blood pressure estimation model comprises a polynomial using the time difference between the two feature points within the one pulse duration as a variable.

10. The wearable device of claim 8, wherein the two feature points are two of a maximum value, a second maximum value, a minimum value and a second minimum value within the pulse duration of the PPG signal.

11. The wearable device of claim 8, wherein the processor is further configured to calculate a respiration cycle according to a plurality of blood pressures using a fast Fourier transform.

12. The wearable device of claim 8, wherein the processor is further configured to calculate a respiration cycle using a time difference between two adjacent minimum blood pressures among a plurality of blood pressures.

13. The wearable device of claim 8, wherein the at least one blood pressure estimation model comprises an estimation model for systolic pressure and an estimation model for diastolic pressure.

14. The wearable device of claim 8, wherein the processor is configured to enter the first mode or the second mode
according to a touch or a slip on a touch panel of the wearable device,
according to a press on a key of the wearable device, or
according to a rotation of a knob of the wearable device.

15. A wearable device, comprising:
a photoplethysmography (PPG) sensor configured to generate a PPG signal according to samples acquired at a sampling frequency of the PPG sensor; and
a processor, configured to
receive an authentication data for authenticating a user when the wearable device is determined to be in contact with a skin surface of the user according to an odd number of the samples of the PPG signal,
execute a predetermined function for the user in response to a request when the authentication data matches a pre-stored data and the wearable device is determined to be still in contact with the skin surface according to the odd number of the samples of the PPG signal, and
reject or ignore the request when the wearable device is determined to be no longer in contact with the skin surface according to the odd number of the samples of the PPG signal after the authentication data is received and before the predetermined function is executed,
wherein the processor is further configured to
calculate at least one blood pressure corresponding to each pulse duration according to at least one blood pressure estimation model and a time difference between two feature points within one pulse duration of the PPG signal using an even number of the samples of the PPG signal, and
average calculated blood pressures within a predetermined time interval to generate an average blood pressure.

16. The wearable device of claim 15, wherein the at least one blood pressure estimation model comprises a polynomial using the time difference between the two feature points within the one pulse duration as a variable.

17. The wearable device of claim 15, wherein the two feature points are two of a maximum value, a second maximum value, a minimum value and a second minimum value within the pulse duration of the PPG signal.

18. The wearable device of claim 15, wherein the processor is further configured to calculate a respiration cycle according to a plurality of blood pressures using a fast Fourier transform.

19. The wearable device of claim 15, wherein the processor is further configured to calculate a respiration cycle using a time difference between two adjacent minimum blood pressures among a plurality of blood pressures.

20. The wearable device of claim 15, wherein the at least one blood pressure estimation model comprises an estimation model for systolic pressure and an estimation model for diastolic pressure.

* * * * *